United States Patent Office 3,300,719
Patented Jan. 24, 1967

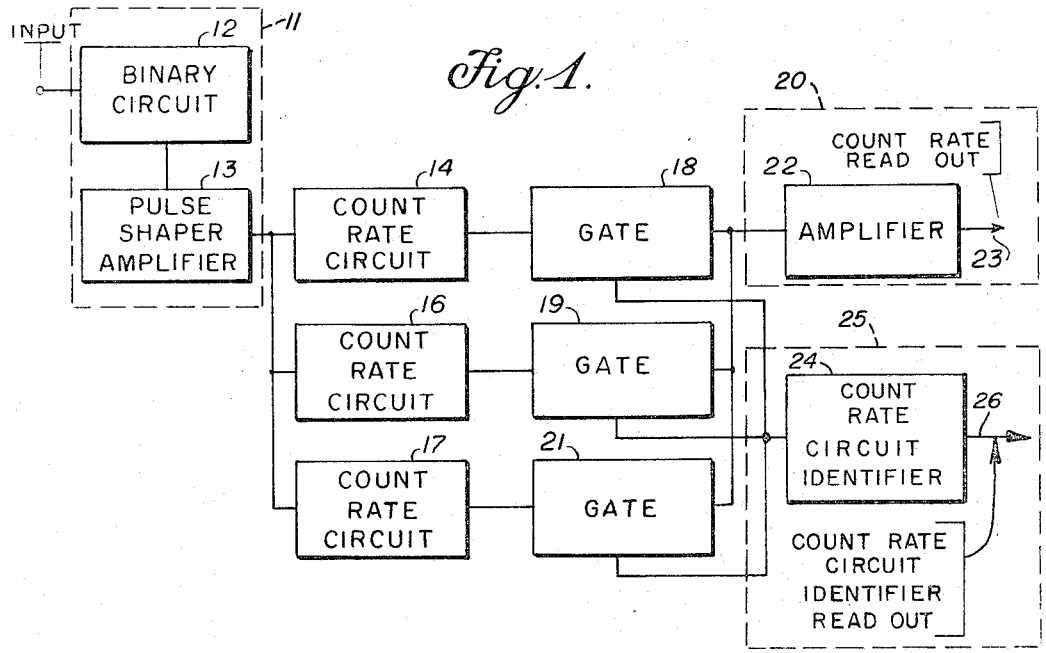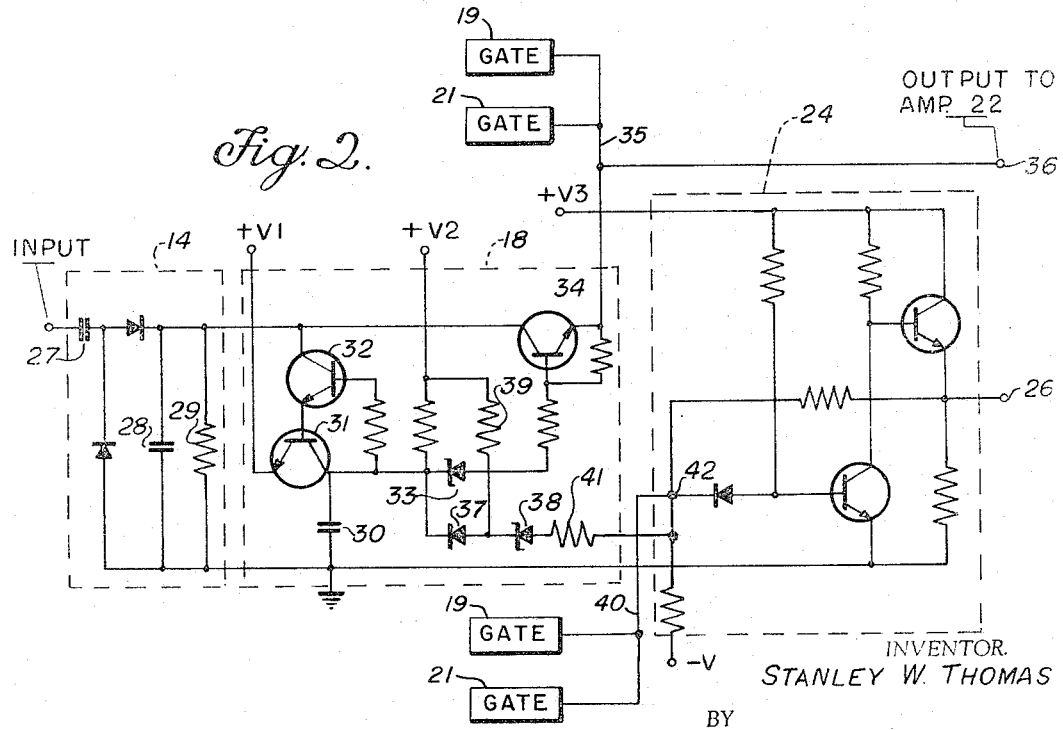

3,300,719
WIDE-RANGE COUNT RATE METER UTILIZING PLURAL COUNT RATE CIRCUITS AND A RANGE IDENTIFIER
Stanley W. Thomas, Livermore, Calif., assignor to the United States of America as represented by the United States Atomic Energy Commission
Filed Oct. 14, 1963, Ser. No. 316,193
6 Claims. (Cl. 324—78)

The invention described herein was made in the course of, or under, Contract W-7405-ENG-48 with the United States Atomic Energy Commission.

This invention relates to count rate meters and, in particular, to a wide-range count rate meter which automatically changes scale in response to the input pulse frequency.

Count rate meters are extensively used to monitor neutron flux in nuclear reactors. They are also frequently included in rocket and satellite instrument packages to measure radiation intensity in outer space.

Conventional count rate meters include a pulse generator (hereinafter referred to as a "driver") which is triggered by pulses from a suitable detector device. The driver generates a pulse of fixed width for each trigger pulse from the detector. The train of output pulses from the driver is integrated by a capacitor, thereby providing an output voltage across the capacitor which is proportional to the frequency of pulses from the detector. One of the disadvantages of using driver output pulses of fixed width is that the driver will have a finite "dead time" corresponding to its output pulse width. During this dead time interval, the driver is not responsive to input trigger pulses from the detector. Consequently, if the period of the trigger pulses is shorter than the driver's dead time, a fraction of the input pulses will not be counted. This disadvantage is generally overcome by designing the driver so that its output pulse width is less than the period of the anticipated pulse rate. However, where the input pulse rate varies over a wide range, say N decades, it is necessary to connect N count rate circuits in parallel, each of which is provided with a separate driver whose output pulse width is designed for a particular decade of input pulse rate. This is true because if the pulse width is short enough for the maximum anticipated count rate, then the average charge per pulse at the minimum count rate will be too small to operate a count rate circuit. It will be apparent that the necessity of using N separate drivers greatly complicates the counting circuitry.

Another disadvantage of conventional wide-range count rate meters is that a separate read-out channel must be provided for each of the count rate circuits connected in parallel. Thus, for a wide-range meter covering N decades of input pulse rate, there will be N count rate circuits in parallel and N read-out channels; one read-out channel for each of the N count rate circuits. The necessity of providing numerous read-out channels is not ordinarily a problem in stationary instrumentation setups such as reactor flux monitoring. However, in rocket and satellite instrumentation, the number of telemetry channels must be minimized since the transmitter bandwidth is limited.

The present invention provides a wide-range count rate meter having none of the disadvantages of conventional rate meters discussed previously. A binary circuit, i.e., a bistable multivibrator, is used to generate a voltage step in response to trigger pulses from the detector. Consecutive trigger pulses cause the binary circuit to switch from one of its stable states to the other, thereby initiating and terminating the output voltage step. The width of the voltage step is thus directly proportional to the interval between consecutive trigger pulses. Thus, in the present invention, the variable width of the output voltage step permits a single binary driver to drive several count rate circuits in parallel. This eliminates the necessity of having a separate driver for each of the count rate circuits.

Although conventional two-diode count rate circuits are used in the invention, the application of a step voltage instead of a quantized pulse causes the count rate circuits to function in an unorthodox manner. The operation of the count rate circuits will be described in detail in connection with the operation of the rest of the circuitry.

Another feature of the invention is that only two read-out channels are required for N count rate circuits connected in parallel. The outputs of the N count rate circuits are connected in parallel through OR gates, such that only the highest output voltage is read out. Thus, when the count rate is within the range of the lowest or first count rate circuit, the output voltage of that circuit is the only one read out. When the count rate increases past the range of the lowest count rate circuit, its output voltage is gated off, thereby permitting the output of the next highest count rate circuit to be read out. This gating action is repeated for the rest of the N count rate circuits. In effect, the meter automatically "changes scale" in response to the input pulse frequency.

A "count-rate-circuit-identifier" circuit is provided to indicate which one of the count rate circuits is being read out at any given time. Thus, only two read-out channels are required for N decades of count rate. One read-out channel is the output of the particular count rate circuit which is gated ON. The other read-out channel is the output of the count-rate-circuit-identifier indicating which one of the N count rate circuits is in the ON state.

The invention will be described with reference to the accompanying drawing, of which:

FIGURE 1 is a block diagram of a three-decade count rate meter; and

FIGURE 2 is a schematic drawing of a single count rate circuit together with its associated gate circuit and the count-rate-circuit-identifier circuit.

Referring now to FIG. 1, there is shown an input pulse driver 11 comprising a binary circuit 12 and a pulse-shaper amplifier 13. Binary circuit 12 is a conventional bistable multivibrator as described in "Pulse and Digital Circuits," Millman & Taub, chap. 5, pp. 595–599, McGraw-Hill (1956). Pulse-shaper amplifiers are discussed in chapters 2–4 of the same reference. Trigger pulses from the detector circuitry, e.g., a fission chamber plus associated amplifier (not shown), are applied at the input of binary circuit 12. Consecutive input pulses switch the binary circuit alternately between its two stable states. Consequently, the binary circuit's output consists of a train of pulses whose width is proportional to the time interval between consecutive input pulses from the detector. Output pulses from binary circuit 12 are amplified and clipped to the proper driving amplitude by amplifier 13. The output impedance of amplifier 13 is low enough to drive the lowest frequency count rate circuit (14) past its maximum rate, i.e., since the RC time constant of circuit 14 is necessarily higher than the time constant of the higher counting rate circuits (16 and 17), the input impedance of circuit 14 is lower than that of circuits 16 and 17. The amplified and clipped pulses from amplifier 13 are applied to the inputs of three count rate circuits 14, 16, and 17, connected in parallel. Each of the count rate circuits covers a single decade of input count rate, so that the three circuits in parallel cover three decades of count rate. It will be understood that the coverage can be extended to N decades by simply adding the desired number of additional count rate circuits, and that the three-decade embodiment shown in FIG. 1 is intended to be merely illustrative of the invention. Count rate circuits 14, 16, and 17 may be, but are not necessarily, of the "two-diode counter" type as described on p. 346 of the Millman and Taub reference.

Each of count rate circuits 14, 16, and 17 has a gate circuit associated with it, 18, 19, and 21, respectively. The operation of the count rate circuits and their associated gates will be described by considering a train of pulses from driver 11 whose frequency is slowly varied through the three decades of count rate covered by the circuit in FIG. 1. Consider now a pulse-repetition rate at the low frequency end of the three decades, i.e., the count rate is just sufficient to provide an output voltage from count rate circuit 14 which covers the lowest of the three decades of count rate. In this condition all gates are in the ON state but, because of the low frequency of the pulses from the driver, only count rate circuit 14 provides an output voltage applied to count rate readout means 20, comprising amplifier 22 and readout channel 23. The output voltage of count rate circuit 14 is amplified by amplifier 22 and fed into channel 23 such as the telemetry instrumentation of a satellite, neutron flux monitor of a reactor, or the like. As the input pulse frequency increases, the output voltage of count rate circuit 14 increases correspondingly until it is high enough to switch gate 18 into the OFF state. This input pulse frequency is just sufficient to exceed the RC time constant of count rate circuit 16, and hence an output voltage is provided across the circuit's integrating capacitor, i.e., the circuit begins to count. The voltage output of circuit 16 is amplified and read out on channel 23. The gating OFF process is repeated for count rate circuit 16 and gate 19 as the input pulse frequency increases further. Although a gate 21 is shown for the highest count rate circuit 17, such a gate is not actually necessary unless additional higher count rate circuits are to be added. From the previous description it can be seen that the switching action of the gates in response to the output voltage of the count rate circuits automatically changes the scale of the count rate meter to accommodate wide fluctuations in input pulse rate.

Gates 18, 19, and 21 are connected in parallel to a count-rate-circuit-identifier circuit 24 whose output is read out on channel 26. The circuitry processing the count rate circuit identification signal is designated by the numeral 26 and provides the information necessary to assign the proper range to the absolute magnitude voltage signal carried on channel 23. Circuit 24 is responsive to the characteristic switching voltage of the gates, and the output voltage on channel 26 indicates which of the gates are in the OFF state. Hence, the channel 26 output indicates which one of the count rate circuits is being read out.

Referring now to FIG. 2, there is shown a schematic diagram of count rate circuit 14, its associated gate circuit 18, and the count-rate-circuit-identifier circuit 24 together with the connections 35 between gate 18 and gates 19 and 21, respectively, as well as the electrical connections 40 between the count rate circuit identifier and gates 19 and 21. Now considering circuit 14, capacitor 27 differentiates the step voltage, therefore quantizing a charge, and capacitor 28 integrates this charge. The output voltage of circuit 14 appears across resistor 29. Charge enters circuit 14 at a rate inversely proportional to the output voltage, and leaves capacitor 28 at a rate proportional to the output voltage. The output voltage becomes constant when the input and output charge rates have reached equilibrium.

Count rate circuit 14 covers the lowest decade of count rate. Transistor 31 is initially OFF. With voltage across capacitor 28, transistor 32 is slightly saturated. However, the current through transistor 32 is insufficient to drive transistor 31 to the ON state. With increasing count rate in the range of circuit 14, the output voltage across capacitor 28 increases until it reaches the emitter voltage of transistor 31 plus the sum of the base-emitter drop of transistor 31 and the saturation voltage of transistor 32. Current then flows through transistor 31. The collector voltage of transistor 31 therefore decreases.

Diode 33 is a zener diode which, when transistor 31 is off, supplies enough current to transistor 34 to saturate it. Saturation of transistor 34 permits the output of circuit 14 to appear across terminal 36, and from there to amplifier 22 and read-out channel 23. When transistor 31 is conducting substantially due to the increased voltage across capacitor 28, the anode of zener diode 33 is at zero volts. Transistor 34 is therefore shut off, and gate 18 is switched into the OFF state. It is thus apparent that when the output of count rate circuit 14 reaches a preset voltage corresponding to its maximum count rate it is gated off from read-out channel 23. After circuit 14 is gated off, count rate circuit 16 is read out at channel 23. The gating of circuit 16 is similar to that described previously for circuit 14.

It should be noted that current from circuit 14 is prevented from entering the other count rate circuits, 16 and 17, by an OR gate effect of the reversed bias emitter junctions of the transistor in gates 19 and 21 which are analogous to transistor 34 in gate 18. It will be understood that although only count rate circuit 14 and gate 18 have been shown and described in detail, the other count rate circuits and gates are similar in all respects.

Referring again to FIG. 2, the operation of the count-rate-circuit-identifier circuit 24 will now be described. The collector voltage of transistor 31 is higher when transistor 31 is off (gate 18 ON) than the voltage at the junction of diode 37 with zener diode 38 and resistor 39. Diode 37 is therefore reverse biased. Thus, positive voltage V2 is placed across resistor 39, zener diode 38, and resistor 41 in series, causing a current to flow through resistor 41. The current flow through the output resistor (41) is similar for gate circuits 19 and 21. All three currents from gate circuits 18, 19, and 21 are summed through lead 40 at the low impedance input (point 42) of count-rate-circuit-identifier circuit 24. The range-identifier circuit comprises together with the circuitry associated with each gate which produces the currents from each gate when the gate is in the ON state conventional grounded emitter and emitter follower staged amplifiers. As mentioned previously, gate 21 is not necessary unless additional rate circuits of higher frequency are included. In the event that gate 21 were not in the circuit, only the currents from gates 18 and 19 would be summed at point 42. During the interval that circuit 14 is counting, the output voltage (channel 26) of circuit 24 is near zero volts (due to the relatively high current at point 42). When the input count rate increases past the range of circuit 14, transistor 31 conducts (gate 18 OFF) and the collector voltage of transistor 31 decreases, thereby decreasing the voltage on the anode of diode 37 (transistor 32 prevents current in excess of saturation current from entering transistor 31, thereby reducing power consumption). The decreased voltage on the anode of diode 37 stops the current flow through zener diode 38, and hence stops current flow through resistor 41. Consequently, the total current summed at point 42 is decreased, thereby increasing the voltage at output 26. The level of the count-rate-circuit-identifier output voltage indicates that the input count rate is now within the range of count rate circuit 16. Similarly, when the count rate capacity of circuit 16 is exceeded, gate 19's contribution of current to input 42 ceases, and the voltage at output 26 is further increased. The new level of output voltage indicates that the count is now within the range of circuit 17. It is therefore apparent that the value of output voltage on read-out channel 26 indicates which of the gate circuits are in the OFF state, and hence indicates which one of the count rate circuits is being read out.

In a count rate meter constructed in accordance with the foregoing description, the circuit component values were as follows:

Count rate circuit 14 (10 to 100 pulses/sec):
  Capacitor 27 _____ 4.7 µf., 10 v.
  Capacitor 28 _____ 100 µf., 10 v.
  Resistor 29 _____ 20 Kohm
  Diodes (both) _____ IN697

Count rate circuit 16 (100 to 1,000 pulses/sec):
  Capacitor 27 _____ 0.47 µf., 100 v.
  Capacitor 28 _____ 10 µf., 10 v.
  Resistor 29 _____ 20 Kohm
  Diodes (both) _____ IN697

Count rate circuit 17 (1,000 to 10,000 cycles/sec):
  Capacitor 27 _____ 0.047 µf., 100 v.
  Capacitor 28 _____ 4.7 µf., 10 v.
  Resistor 29 _____ 20 Kohm
  Diodes (both) _____ IN697

Gate circuit 18:
  Capacitor 30 _____ 4.7 µf., 20 v.
  Resistor 39 _____ 100 Kohm
  Resistor 41 _____ 510 Kohm
  Zener diode 33 _____ IN753A
  Zener diode 38 _____ IN754A
  Diode 37 _____ IN697
  Transistor 31 _____ 2N2222
  Transistor 32 _____ 2N2484
  Transistor 34 _____ 2N2484

Component values in gate circuits 19 and 21 are the same as in circuit 18, except that capacitor 30 is 2.2 µf., 20 v. in gate 19, and 0.1 µf., 75 v. in gate 21.

A count rate meter having the component values listed above was incorporated into the instrument package of an Air Force "Starad" satellite orbited in 1962. The inputs to the count rate circuits consisted of solid-state silicon electron detectors. Performance data was as follows: count rate —2 to 20,000 counts/second; power consumption —10 milliwatts in the noncounting state, 20 milliwatts in the maximum counting state; rate meter response time —0.5 second.

Although the invention has been described with specific reference to a wide-range count rate meter, those skilled in the art will recognize that the gating and count-rate-circuit-identifier circuits may be employed with input circuits other than a count rate circuit. The gating and count-rate-circuit-identifier circuits comprise in combination a voltage level detector. The inputs to this detector may consist of any voltage whose level is desired to be measured. For example, the input circuitry preceding each of the gates and count-rate-circuit-identifier could comprise a voltage-level discriminator circuit, so that the overall circuit would function as a wide-range voltmeter with an automatic scale change feature. Other applications will be apparent to those skilled in the art.

It should also be understood that although a transistorized embodiment of the invention has been described, an equivalent vacuum tube circuit can be readily constructed to perform the same functions. Also, although only a three-decade embodiment of the count rate meter has been described, it will be apparent that additional count rate circuits may be incorporated therein so as to provide N decades of count rate coverage, where N is some number other than three.

Other modifications may be made without departing from the scope of the invention, and it is intended that the invention be limited only by the following claims.

What is claimed is:

1. A multirange pulse rate metering device comprising:
  (a) an input pulse driver stage for converting random electrical pulses into a train of uniform height electrical pulses delivered at an output terminal, and having a width proportional to the time interval between consecutive random pulses;
  (b) a plurality N of count rate circuits with their inputs connected in parallel to the output of said driver stage, said count rate circuits including means for converting the output pulses of said driver stage into an output voltage indicative of the number of said pulses, said count rate circuits having RC time constant characteristics corresponding to progressively higher adjacent count rate ranges, and the maximum output voltage of each count rate circuit corresponding to the upper limit of its range;
  (c) a count rate readout terminal;
  (d) separate gate means, each having an input and an output, and one each connected to the outputs of said count rate circuits for passing the output voltage of its respective count rate circuit to said readout terminal and including a normally open, electronic switching means connected between the input and output terminals thereof, said gate means further including means for sensing attainment of said upper limit output voltage of its respective count rate circuit to close said switching means to terminate transmission of the count rate indicating voltage therethrough; said gate means having their outputs connected in parallel to said count rate readout terminal; and
  (e) count rate circuit identifier means electrically communicative with said gate means for deriving and delivering an output voltage indicative as to which of said count rate circuits has an output signal lower than its respective upper limit.

2. A pulse rate metering device as defined in claim 1 wherein said input driver stage comprises a bistable multivibrator into which said pulses are introduced and which is operatively connected to a pulse shaper amplifier from which said pulses are delivered to said output terminal.

3. A pulse rate metering device as defined in claim 1 wherein said input driver stage comprises a bistable multivibrator into which said pulses are introduced and which is operatively connected to a pulse shaper amplifier from which said pulses are delivered to said output terminal, and said count rate circuits include a differentiating capacitor connected at one terminal to the output of said input driver stage and the other terminal to the juncture of two diodes series connected between ground and the output of said count rate circuit and with an integrating capacitor and resistor connected in parallel between ground and the output of said count rate meter, to determine the counting range of said circuit.

4. A multirange metering device for determining the count rate of random electrical pulses, comprising:
  (a) an input pulse driver stage for converting said random pulses into a train of pulses having uniform height and having a pulse width proportional to the time interval between consecutive random pulses, with said train of pulses delivered at the output terminal thereof;
  (b) a plurality N of count rate circuits, with the input terminals connected in parallel to the output terminal of said driver stage, each including a differentiating capacitor with one terminal connected to the input terminal, and the other to the juncture of a pair of diodes connected in series from a ground reference point to the output terminal of said circuit, each having a rate determining capacitor and resistor connected in parallel between the output terminal and said ground reference point, and with the value of said capacitor and resistances having RC constants corresponding to progressively wider count rate ranges sequentially from 1 to N of said circuits, providing wider count rate ranges when such circuits are sequentially inactivated as the count rate exceeds and the output voltage corresponds to the upper limits of said range; and (c) a plurality of gate means, one each of which includes a gate transistor having a collector connected as the input thereof to the output of one of said count rate meters, the emitters connected in common to an output readout terminal, and each supplied with a saturating voltage in the conducting state, said means including means for detecting attainment of said upper limit output voltage and for turning off said transistor by removing said saturating voltage from the base of said transistor, wherefore the next sequentially wider range count rate circuit is activated and supplies the output rate indication voltages into said readout terminal.

5. A metering device as defined in claim 4, wherein said gate means includes a second transistor connected to the input terminal, the emitter connected to the base of a third transistor and the base through a resistor to the collector of said third transistor; said third transistor having the emitter connected to a voltage source, the base connected through a first zener diode in series with a resistor to the base of said first transistor for supplying saturating voltage when the third transistor is off, and also through a resistor to a second voltage source, the base of the third transistor also connected in series with a second diode and a resistor to said second voltage source with the junction of said second diode and resistor connected through a third zener diode to a third voltage source terminal, wherefore as the count rate circuit output voltage reaches substantially said upper limit and said third transistor is caused to conduct terminating current flow through said third zener diode and series resistor, as well as to shut off said first transistor.

6. A metering device as defined in claim 5 wherein said third voltage source terminals are connected to a common terminal wherein the input current to all of said circuits is summed to a maximum value in initial stages of operation, and whereat sequential switching off of said count rate gate circuits causes a correlative sequential step current drop to occur thereat, the voltage change produced by said current drop of a magnitude indicative of which count rate range is operating, and said terminal providing for correction of voltage sensing means thereto to sense the voltage step drop thereat and indicate the corresponding rate meter range.

References Cited by the Examiner
UNITED STATES PATENTS 2,837,642 6/1958 Schenck _____ 328—109 X
3,187,323 6/1965 Flood et al. _____ 324—115 X RUDOLPH V. ROLINEC, *Primary Examiner.*

WALTER L. CARLSON, *Examiner.*

P. F. WILLE, *Assistant Examiner.*